United States Patent
Scott, II et al.

(10) Patent No.: US 11,055,533 B1
(45) Date of Patent: Jul. 6, 2021

(54) TRANSLATING SOUND EVENTS TO SPEECH AND AR CONTENT

(71) Applicant: International Business Machines Corporation, Armonk, NY (US)

(72) Inventors: Willie L Scott, II, Austin, TX (US); Seema Nagar, Bangalare (IN); Charu Pandhi, Round Rock, TX (US); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/732,847

(22) Filed: Jan. 2, 2020

(51) Int. Cl.
| | |
|---|---|
| *G06K 9/00* | (2006.01) |
| *G10L 15/22* | (2006.01) |
| *G10L 13/027* | (2013.01) |
| *G06N 20/00* | (2019.01) |
| *G06T 7/13* | (2017.01) |
| *G06T 7/73* | (2017.01) |
| *G06F 3/01* | (2006.01) |
| *G10L 15/26* | (2006.01) |

(52) U.S. Cl.
CPC ......... *G06K 9/00671* (2013.01); *G06F 3/013* (2013.01); *G06N 20/00* (2019.01); *G06T 7/13* (2017.01); *G06T 7/74* (2017.01); *G10L 13/027* (2013.01); *G10L 15/26* (2013.01); *G06T 2210/12* (2013.01)

(58) Field of Classification Search
CPC ... G06K 9/00671; G10L 15/22; H04R 29/008
See application file for complete search history.

(56) References Cited

U.S. PATENT DOCUMENTS

| | | | |
|---|---|---|---|
| 8,996,376 | B2 | 3/2015 | Fleizach et al. |
| 2008/0243624 | A1 | 10/2008 | Perry et al. |

(Continued)

FOREIGN PATENT DOCUMENTS

| | | |
|---|---|---|
| CN | 104039293 A | 9/2014 |
| EP | 2677982 A1 | 1/2014 |

OTHER PUBLICATIONS

Carlos Fernández Scola and María Dolores Bolaños Ortega, "Direction of arrival estimation—A two microphones approach," Blekinge Institute of Technology, Sep. 2010, 86 pages.

(Continued)

*Primary Examiner* — Yi Yang
(74) *Attorney, Agent, or Firm* — Patterson + Sheridan, LLP (57) ABSTRACT

Embodiments herein provide an augmented reality (AR) system that uses sound localization to identify sounds that may be of interest to a user and generates an audio description of the source of the sound as well as AR content that can be magnified and displayed to the user. In one embodiment, an AR device captures images that have the source of the sound within their field of view. Using machine learning (ML) techniques, the AR device can identify the object creating the sound (i.e., the sound source). A description of the sound source and its actions can outputted to the user. In parallel, the AR device can also generate AR content for the sound source. For example, the AR device can magnify the sound source to a size that is viewable to the user and create AR content that is then superimposed onto a display.

14 Claims, 6 Drawing Sheets

(56) References Cited

U.S. PATENT DOCUMENTS

| | | | |
|---|---|---|---|
| 2012/0182429 A1* | 7/2012 | Forutanpour | H04R 3/005 |
| | | | 348/175 |
| 2013/0279705 A1* | 10/2013 | Wong | H04R 29/008 |
| | | | 381/56 |
| 2017/0319123 A1 | 11/2017 | Voss et al. | |
| 2018/0174584 A1* | 6/2018 | Chih | F16M 11/10 |
| 2018/0302738 A1* | 10/2018 | Di Censo | G06F 3/165 |
| 2018/0359572 A1 | 12/2018 | Jensen et al. | |
| 2019/0228229 A1* | 7/2019 | Cotoros | G06K 9/00718 |

OTHER PUBLICATIONS

Dunai et al.,"Virtual Sound Localization by Blind People," Archives of Acoustics vol. 40, No. 4, pp. 561-567 (2015).

Sharma et al., "Demo: Sound localization using smartphone,"Singapore Management University, MobiSys'16 Companion Jun. 25-30, 2016, 2 pages.

Disclosed Anonymously, "A Novel and Practical System and Method to simulate the hearing and response process of normal people for the deaf individuals," IPCOM000210669D, Sep. 8, 2011, 6 pages.

Ulrich Pomper & Maria Chait,"The impact of visual gaze direction on auditory object tracking," Scientific Reports, Jul. 5, 2017, 16 pages.

Davide Mulfari, "A TensorFlow-based Assistive Technology System for Users with Visual Impairments," University of Pisa, W4A '18, Apr. 23-25, 2018, 2 pages.

Disclosed Anonymously,"Auto-configurable Hazard Notifier for Visually Impaired People Using Physical Characteristics and IoT and Wearable Device Sensors," IPCOM000259053D, Jul. 8, 2019, 11 pages.

* cited by examiner

TRANSLATING SOUND EVENTS TO SPEECH AND AR CONTENT

BACKGROUND

The present invention relates to identifying sounds of interest to a user.

There are a variety of current technologies that aide visually impaired people in mundane tasks. Examples include haptic shoes, navigational bracelets, and video magnifiers. In addition, smart phones apps have corresponding versions for improved accessibility. However, none of these solutions help the visually impaired when outside of controlled environments or when performing more complicated tasks. When moving in the real world, the visually impaired can often hear and process what is going on around them but often lack the ability to view the source of the sound and correlate the sound with a particular object or action.

SUMMARY

According to one embodiment of the present invention is a method that includes identifying a sound of interest to a user, capturing images in a direction of the sound relative to the user, identifying a plurality of objects in the captured images where the plurality of objects are potential candidates of a source of the sound, and identifying the source of the sound from the plurality of objects based on a distance and direction of the sound relative to the user. The method also includes generating an audio description of the source of the sound, magnifying a portion of at least one of the captured images containing the source of the sound to generate augmented reality (AR) content, and transmitting for output the audio description and the AR content, wherein the AR content is superimposed onto a display.

Another embodiment described herein is a computer readable storage medium having computer-readable program code embodied therewith, the computer-readable program code executable by one or more computer processors to perform an operation. The operation includes identifying a sound of interest to a user, capturing images in a direction of the sound relative to the user, identifying a plurality of objects in the captured images where the plurality of objects are potential candidates of a source of the sound, and identifying the source of the sound from the plurality of objects based on a distance and direction of the sound relative to the user. The operation also includes generating an audio description of the source of the sound, magnifying a portion of at least one of the captured images containing the source of the sound to generate augmented reality (AR) content, and transmitting for output the audio description and the AR content, wherein the AR content is superimposed onto a display.

Another embodiment described herein is an AR device that includes a display, a speaker, a processor, and memory containing a computer program, wherein, when executed by the processor, the computer program performs an operation. The operation includes identifying a sound of interest to a user, capturing images in a direction of the sound relative to the user, identifying a plurality of objects in the captured images where the plurality of objects are potential candidates of a source of the sound, and identifying the source of the sound from the plurality of objects based on a distance and direction of the sound relative to the user. The operation also includes generating an audio description of the source of the sound, magnifying a portion of at least one of the captured images containing the source of the sound to generate AR content, and transmitting for output the audio description and the AR content, wherein the AR content is superimposed onto the display.

DETAILED DESCRIPTION

Embodiments herein provide an augmented reality (AR) system that uses sound localization to identify sounds that may be of interest to a user and generates an audio description of the source of the sound as well as AR content that can be magnified and displayed to the user. In one embodiment, the AR system includes an AR device with a camera(s) for capturing images (e.g., video) that have the source of the sound within their field of view (FOV). Using machine learning (ML) techniques, the AR device can identify the object creating the sound (i.e., the sound source). With this information, other ML techniques can be used describe the object and any actions it may be performing. The AR device converts a description of the object and its actions into speech which can then be outputted to the user.

In parallel, the AR device can generate AR content for the sound source. For example, using edge detection, the AR device can identify the sound source from a bounding box. The AR device can then magnify the sound source to a size that is viewable to the user (which can depend on the user's visual abilities) and create AR content that is superimposed onto a display. For example, the AR device can be a heads up display (HUD) worn by the user. In another example, the AR device can be a handheld device (e.g., a tablet or smartphone) where the AR content is displayed on its screen. In either case, the AR device can both generate and output an audio description of the sound source as well as magnify AR content of the sound source. The user can then correlate a sound to both an audio description and visual image of its source.

Figure 1:
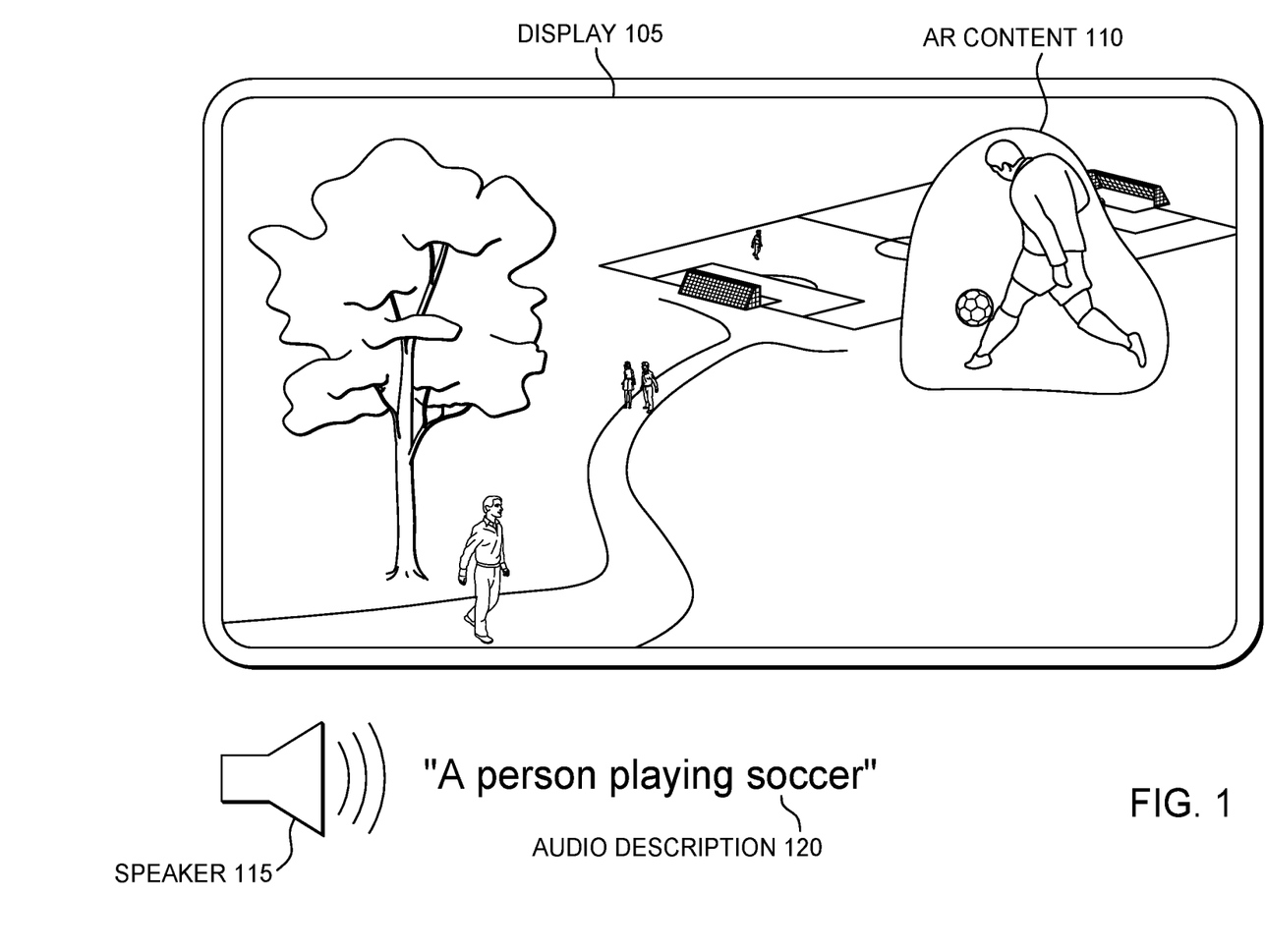
FIG. 1 illustrates providing augmented reality (AR) content and an audio description of a real-world event, according to one embodiment described herein.

FIG. 1 illustrates providing AR content 110 and an audio description 120 of a real-world event, according to one embodiment described herein. FIG. 1 includes a display 105 and a speaker 115 that can be part of a wearable device (e.g., a HUD) or a handheld device (e.g., a smart phone or tablet). In this example, the display 105 outputs an image of a real-world event that can be captured using a camera. However, in another embodiment, rather than displaying an image captured using a camera on, e.g., a LCD or LED display screen, the display 105 can instead be transparent such that environmental light can pass through the display 105 to reach the eyes of the user.

In FIG. 1, the real-world event includes people playing soccer in the distance. If the user is visually impaired, she may be able to hear the sounds associated with this event (e.g., shouting, laughter, a ball being kicked, etc.) but not be able to see the event. In the embodiments herein, an AR device can identify the source of the sound (or sounds) and generate a magnified version of the source as AR content 110. That is, the AR device determines that the player kicking the ball is the source of the sound and then generates a magnified (larger) version of the source that is then superimposed onto the display 105 as the AR content 110. The AR device can magnify the AR content 110 to a size that is readily viewable to the visually impaired user. Additionally, the display 105 can output markers or demarcations to set apart the AR content 110 from the other objects in the display 105.

In addition to generating the AR content 110, the AR device can use the speaker 115 to output an audio description of the source as well as its action or actions. In this example, the audio description 120 is "A PERSON PLAYING SOCCER" which indicates the source of the sound (i.e., a person) and its action (i.e., playing soccer). The user can correlate the sound she hears (e.g., the sounds generated by the soccer player) to the AR content 110 and the audio description 120. In this manner, the visual abilities of the user is enhanced so she can better process and understand real-world events occurring around her. Moreover, the embodiments herein are not limited for use with a visually impaired person. The AR device could be used by any user regardless of her visual abilities to magnify sound sources and provide an audio description of real-world events that are beyond the capabilities of the user.

Figure 2:
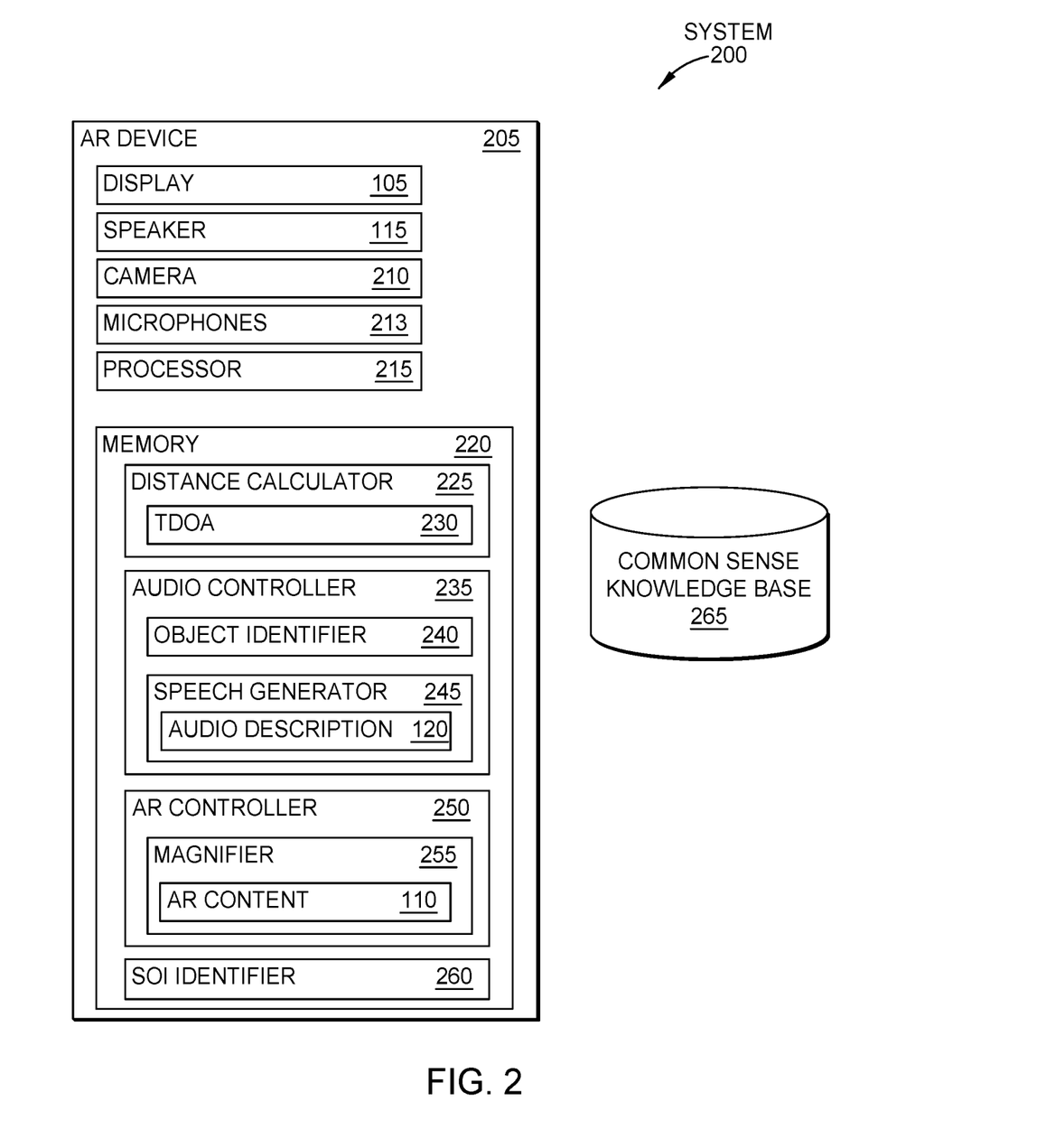
FIG. 2 is a block diagram of a system for generating AR content and audio descriptions of real-world events, according to one embodiment described herein.

FIG. 2 is a block diagram of a system 200 for generating AR content 110 and audio descriptions 120 of real-world events, according to one embodiment described herein. The system 200 includes an AR device 205 and a common sense knowledge base 265. The AR device 205 can be a wearable or a handheld device, and includes the display 105, the speaker 115, a camera 210, microphones 213, a processor 215, and memory 220. The display 105 can be any transparent or non-transparent display that can superimpose the AR content 110 on a view of a real-world event, e.g., as shown in FIG. 1. For example, the camera 210 can capture images of a real-world event that are then outputted on the display 105 along with the AR content 110. The speaker 115 can be any device capable of outputting the audio descriptions 120 of a sound source.

The processor 215 represents any number of processing elements (e.g., central processing units (CPUs)) that each can include any number of processing cores. The memory 220 can include volatile memory elements, non-volatile memory elements, and combinations thereof. Moreover, the AR device 205 can include an operating system, although not necessary.

As shown, the memory 220 stores a distance calculator 225, an audio controller 235, an AR controller 250, and a sound of interest (SOI) identifier 260, which may be software applications or modules. The distance calculator 225 uses time difference of arrival (TDOA) 230 to determine a location of a source generating a sound. That is, the distance calculator 225 can use the microphones 213 to perform TDOA 230 and identify a distance from the AR device 205 to a sound source. Acoustic source localization is the task of locating a sound source given measurements of the sound field. The TDOA technique for acoustic source localization uses (at least) two microphones, to compute the direction and distance of the acoustic source by using the different times the signal arrived at the microphones to triangulate its position. Knowing the direction and distance of the sound source can help the AR device 205 to generate the AR content 110 and the audio description 120 as described below.

The audio controller 235 is tasked with generating the audio description 120. To do so, the audio controller 235 includes an object identifier 240 and a speech generator 245. In one embodiment, the object identifier 240 performs a ML technique that identifies objects in captured images. That is, using images captured by the camera 210 and the location of the sound source identified by the distance calculator 225, the object identifier 240 can determine what object in the captured images is the sound source. In one embodiment, the object identifier 240 decomposes the captured video of the user's FOV into image frames. For each frame, the object identifier 240 uses a visual recognition ML technique to perform object detection within the frame such as, e.g., a custom trained You-Only-Look-Once (YOLO) convolutional neural network model to perform object detection of the elements within the frame, capturing the bounding box coordinates of detected elements/regions.

The speech generator 245 can use a language model to generate text for the objects and actions identified by the object identifier 240. In one embodiment, the language model is a long short-term memory (LSTM) recurrent neural network that is trained on encoded video frames images and word-embedding that describe the objects and corresponding actions occurring in the images. The speech generator 245 can then translate the text into the audio descriptions 120.

The AR controller 250 generates the AR content 110 that is superimposed onto the display 105. In one embodiment, the AR controller 250 identifies the sound source from the objects detected by the object identifier 240. The AR controller can use a magnifier 255 to magnify (or increase) the size of the sound source relative to its original size in the user's FOV. The original size of the sound source may be too small for the user to see in the display 105. Thus, the magnifier 255 can increase the size of the source to a predetermined size (or by a predetermined amount) to generate the AR content 110 that is then outputted on the display 105. For example, the AR controller 250 may superimpose the AR content 110 in the same location in the display 105 as the location of the sound source (which is now occluded by the AR content 110).

The AR controller 250 can generate the AR content 110 as a still image or as a series of images that update in real-time. That is, the AR controller 250 can generate a single image of a magnified version of the sound source, or continuously generate magnified images of the sound source as the AR content 110, which track the movement of the sound source in real-time.

The SOI identifier 260 identifies sounds that are (or may be) of interest to the user, and in response, instructs the distance calculator 225, audio controller 235, and the AR controller 250 to perform their respective functions to generate the audio description 120 and AR content 110 for the sound identified by the SOI identifier 260. The SOI identifier 260 can rely on cues from the user to automatically identify a sound source, such as the user suddenly turning her head to face a new sound. Alternatively, the SOI identifier 260 can wait for an instruction from the user to identify a sound and provide the audio description 120 and AR content 110 for the source of that sound.

The common sense knowledge base 265 can be used by the AR device 205 to identify a source of a sound when the images may contain many different objects. For example, the object identifier 240 may identify a plurality of different objects in the images. The audio controller 235 can use the common sense knowledge base 265 to eliminate objects as potential candidates as the source of the sound. For example, the audio controller 235 may characterize the sound such as, e.g., a sound made be a human, a sound made by an animal, or a sound made by an object. Using this characterization, the common sense knowledge base 265 may be able to eliminate several of the objects identified by the object identifier 240 as potential candidates of the source of the sound.

Although the common sense knowledge base 265 is shown external to the AR device 205, it may instead be stored in the memory 220 of the AR device 205. However, given the amount of data stored in the knowledge base 265, it may be advantageous to transmit queries to the knowledge base 265 which may be hosted on an external computing system, e.g., a cloud computing environment. Conversely, while the distance calculator 225, audio controller 235, AR controller 250, and SOI identifier 260 are hosted on the AR device 205, alternatively these software applications could be hosted in a cloud computing environment where the AR device 205 sends the information it gathers (e.g., the images captured by the camera 210 and the sound recorded by the microphones 213) to the cloud computing environment.

Figure 3:
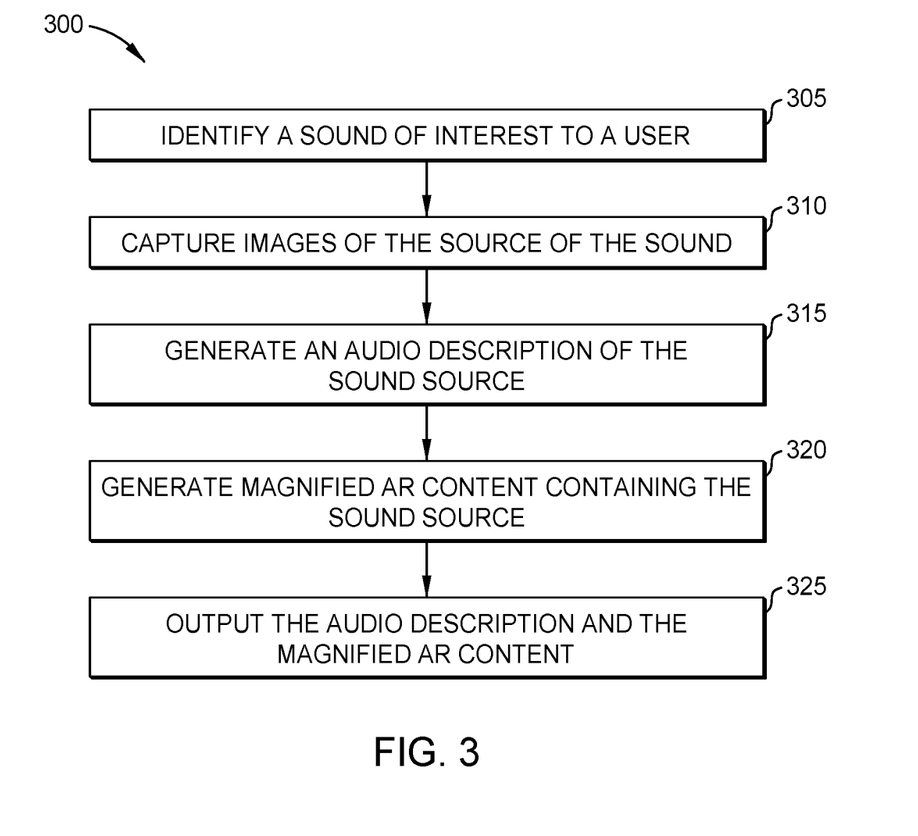
FIG. 3 is a flowchart for outputting AR content and an audio description of a real-world event, according to one embodiment described herein.

FIG. 3 is a flowchart of a method 300 for outputting AR content and an audio description of a real-world event, according to one embodiment described herein. At block 305, the SOI identifier identifies a sound of interest to a user. The SOI identifier can identify a sound of interest (e.g., a relevant sound) either automatically (without a prompt from the user) or manually in response to an explicit instruction from the user. For example, the SOI identifier may monitor the position and orientation of the user's head or gaze. If the user makes a sudden motion at the same time a new sound is detected by the microphones, the SOI identifier may assume the sound is of interest to the user (e.g., the user is curious about the sound or wants to know the source of the sound). The AR device may include various gyroscopes and eye tracking sensors to determine the orientation of the user's head and gaze.

In another example, the SOI identifier may identify a sound of interest by tracking new sounds (over a particular audio threshold) that are within a current FOV of the user. That is, if the user is staring in a direction where a new sound is originating from, the SOI identifier assumes the sound is of interest to the user without the user having to prompt the SOI identifier. Or the SOI identifier may identify predefined sounds which are known to be of interest to the user such as someone call the user's name or someone using a salutation.

Alternatively, rather than automatically identifying sounds of interest, the user may use a voice command (which is detected by the microphones in the AR device) to instruct the SOI identifier that there is a sound of interest that is originating from within the user's current FOV. In other examples, the user may press a button or use a gesture to inform the SOI identifier the user is curious about a sound (and its source).

At block 310, the SOI identifier instructs the camera in the AR device to capture images of the sound. That is, block 310 assumes the user has turned her head so that, according to the best guess of the user, the source of the sound is within the user's FOV. Of course, due to an echo or reflections, although the user believes the source is with her FOV, it may not be. Those instances can be detected as discussed below.

However, assuming the source is within the FOV, the camera can capture multiple images (e.g., video) of the FOV. The images can then be transmitted to the object identifier for further processing. Moreover, the images may be processed by the object identifier on the AR device or may be transmitted to a remote computing system (e.g., a cloud computing system) for processing.

At block 315, the audio controller generates an audio description of the sound source using the captured images. As described in more detail in FIG. 4, the audio controller can use ML techniques to identify objects in the images that are in the direction of the sound. Once the source is identified, the audio controller can identify the object and its action (if any). With this information, the audio controller can generate text describing the object and its action which can then be converted to the audio description.

At block 320, the AR controller generates magnified AR content containing the sound source. Because the sound source was identified in block 315, the AR controller can use this information to generate a magnified version of the sound source that can be superimposed onto the display of the AR device. That is, the sound source may be too small in the user's FOV to see clearly, either because the sound source is small or is located too far away from the user. The AR controller magnifies the sound source to a size that is easily viewable to the user when the AR content is displayed. The details of generating the magnified AR content are described in more detail in FIG. 6.

While the embodiments herein describe that the audio controller identifies the source of the sound in the images captured by the camera, this function may instead be performed by the AR controller, or by a software module separate from both the AR and audio controllers.

At block 325, AR device outputs the audio description and the magnified AR content. That is, the AR device can superimpose the AR content onto a display. This AR content can overlay (or occlude) portions of the view of the environment that otherwise would be viewable to the user. For example, the AR device may display the AR content in a location in the display that corresponds to the location of the sound source to give the user a better idea where the sound source is located in her FOV, but this is not a requirement. For example, the AR device could display the AR content in a location to the side of the display so not to occlude a portion of the FOV directly in front of the user. For example, if the sound source is located in front of the user, the AR device may display a bright circle around the location of the source to inform the user of its location but display the magnified AR content to the side of the display.

The audio description can be outputted using one or more speakers. The audio description could also be transmitted to wireless or wired headphones worn by the user. Moreover, the AR device may output the audio description and the AR content in parallel, but this is not a requirement.

Figure 4:
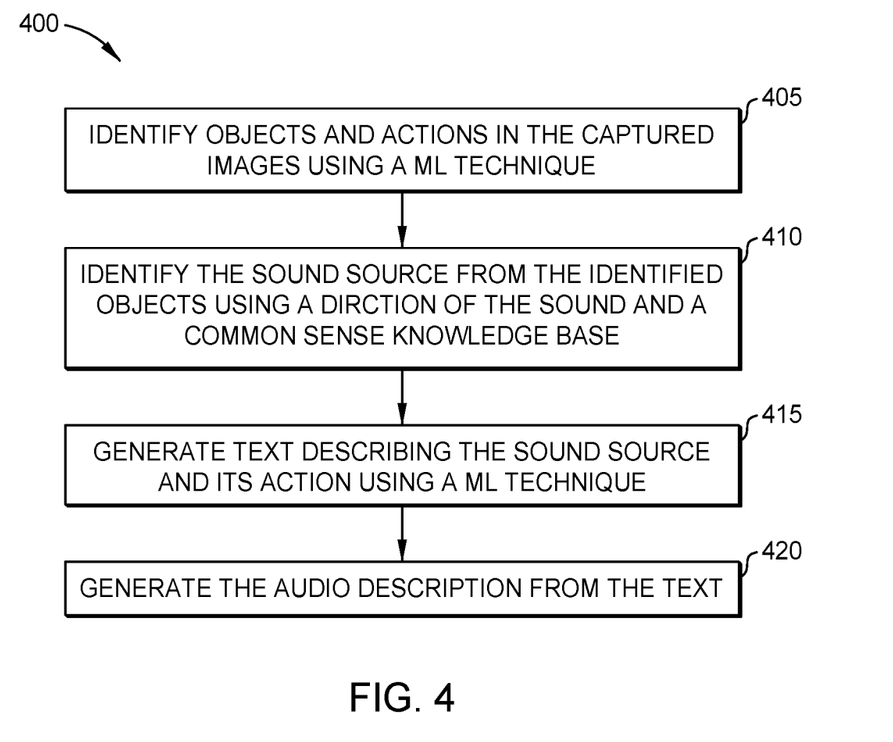
FIG. 4 is a flowchart for generating an audio description of a real-world event, according to one embodiment described herein.

FIG. 4 is a flowchart of a method 400 for generating an audio description of a real-world event, according to one embodiment described herein. In one embodiment, the method 400 begins after block 310 of FIG. 3 where the camera has captured several images of the sound source.

At block 405, the object identifier in the audio controller identifies objects and actions in the captured images using a ML technique. That is, the object identifier can process the images to identify the objects and the actions being performed by those objects (if any). Referring to the example in FIG. 1, the object identifier can identify the tree, soccer players, and soccer ball. The object identifier can also identify the action of the objects such as a soccer player kicking the soccer ball.

In one embodiment, for each captured image (or frame), the object identifier uses a visual recognition ML technique to perform object detection within the image such as, e.g., a custom trained YOLO convolutional neural network model to perform object detection of the elements within the image, capturing the bounding box coordinates of detected elements/regions.

At block 410, the object identifier identifies the sound source from the identified objects using a direction and distance of the source and a common sense knowledge base. For example, after identifying the sound of interest to the user, the distance calculator can use sound localization techniques to identify the distance and direction of the sound relative to the user. Knowing the distance and direction can help the object identifier to identify which of the objects in the captured images is the source of the sound. For example, the distance calculator may determine the sound originates from the right side of the image shown in FIG. 1. Based on that, the object identifier can eliminate the tree as the source of the sound and the soccer players that are in the middle of the image. Further, using the distance, the object identifier can eliminate objects that are too closer or too far away from the user. That is, the object identifier can deduce the distance of each of the objects relative to the user and determine whether those distances are within a threshold of the distance of the sound source from the user. If not, the object identifier can eliminate those objects as potential sources of the sound.

The object identifier can also use the common sense knowledge base to eliminate identified objects that cannot generate the sound. For example, the audio controller may determine that the sound is a vocal sound (e.g., shouts made by soccer players) which the common sense knowledge base would inform the object identifier cannot be made by the tree in FIG. 1. Or the audio controller may determine that the sound is non-vocal which the common sense knowledge base can use to eliminate humans or animals as the sound source. In this manner, the object identifier can identify which object in the captured image is most likely the source of the sound.

In one embodiment, the object identifier may determine that none of the objects captured in the images is the source of the sound. That is, using the direction/distance of the sound and the common sense knowledge base, the object identifier may eliminate all of the identified objects as potential sources of the sound. For example, the actual source of the sound may be occluded (hidden behind a fence, trees, or within a building) or the sound may have been reflected or an echo such that the source is not within the FOV of the user. In that case, the AR headset may output a failure notification to the user indicated the AR content and audio description cannot be generated.

In another embodiment, the source of the sound may be partially occluded by other objects. For example, the source of the sound may be partially blocked by trees or an object that is closer to the user than the sound source. In that case, the common sense knowledge base can again be used to eliminate the occluding objects a potential sources of the sound by identifying their types and determining whether they can be the source of the sound. That is, even when objects are tightly clustered (and thus the direction of the sound alone is not enough to determine which object is the source), the object identifier can use the common sense knowledge base to identify the sound source.

Figure 5:
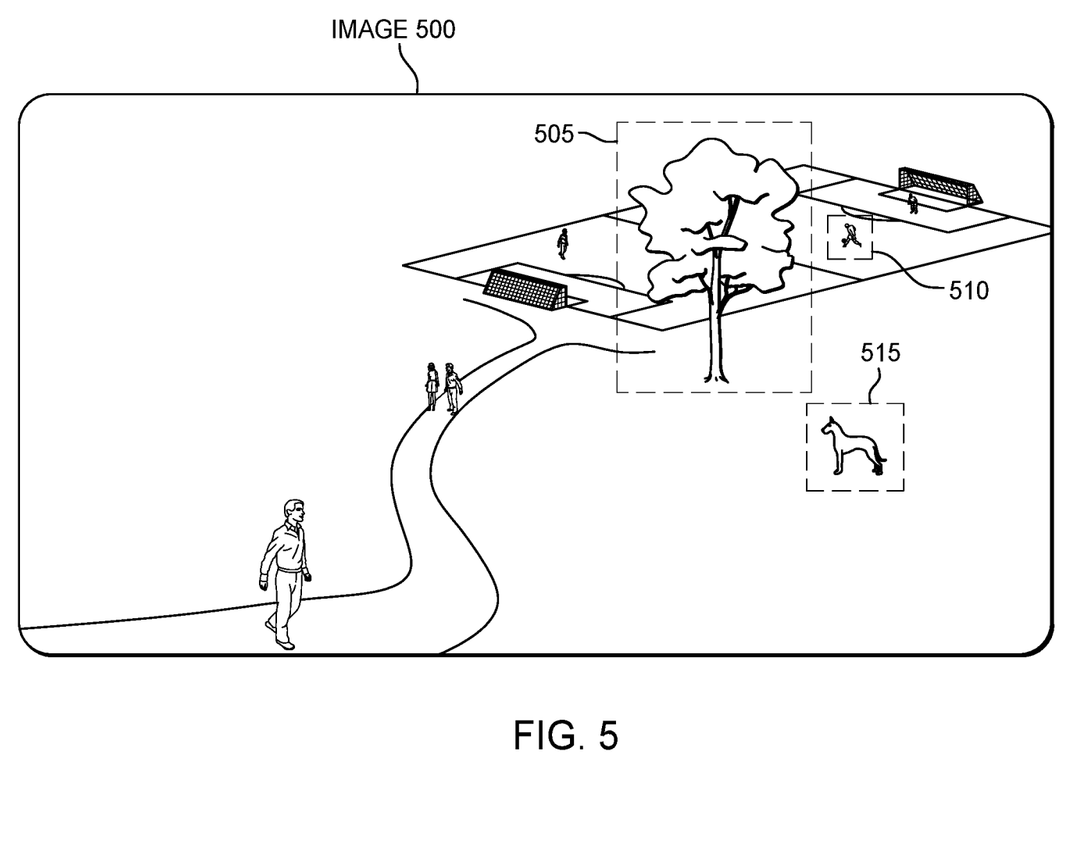
FIG. 5 illustrates identifying a sound source from a plurality of objects, according to one embodiment described herein.

FIG. 5 illustrates identifying a sound source from a plurality of objects, according to one embodiment described herein. In one embodiment, the techniques described above in block 410 of method 400 can be used to identify the sound source from among a plurality of identified objects. In the image 500, the object identifier has identified objects 505, 510, and 515 as indicated by the bounding boxes. Here it is assumed that object 510 (i.e., the soccer player) is the source of the sound.

The object identifier can use the direction of the sound to eliminate the object 505 (i.e., a tree) since its direction relative to the user is too far from the direction of the sound source. However, the direction of the object 515 may be too similar to the direction of the sound source for the object identifier to eliminate the object 515 from contention. However, the distance of the object 515 from the user may be much smaller than the distance of the sound source. That is, the object 515 is disposed between the user and the sound source. In that case, the object identifier can eliminate the object 515 as the sound source.

Moreover, if the soccer player (i.e., the object 510) moved further to the left, the player may be next to, or partially occluded by, the object 505, and thus, may have a similar direction and distance relative to the user. In that case, the common sense knowledge base can determine, based on characterizing the sound and the objects 505, 510 that the object 505 is not capable of producing the sound (e.g., sounds made by a soccer player when playing soccer). In that case, when multiple identified objects have similar distances and directions relative to the user as the sound source, the object identifier can nonetheless eliminate some of the objects using the common sense knowledge base.

Returning to the method 400, at block 415, the speech generator generates text describing the sound source and its action using a ML technique. That is, speech generator can use objects and actions identified previously to generate textual descriptions of the actions—e.g., "a person playing soccer" or "a child playing with a toy car." In one embodiment, the speech generator uses a language model to generate text for the objects and actions identified by the object identifier. In one embodiment, the language model is a LSTM recurrent neural network that is trained on encoded video frames images and word-embedding that describe the objects and corresponding actions occurring in the images.

At block 420, the speech generator generates the audio description from the text. The speech generator may perform a text to speech conversion to generate the audio description of the object (i.e., the sound source) and any actions the object is performing. As mentioned above, this audio description can be output to user using speakers in an AR device (e.g., a HUD or a smart phone or tablet).

In one embodiment, the object identifier is unable to confidently identify the source of the sound using the distance, direction, and common sense knowledge base as described above. For example, there may be several objects that could be the source of the sound. In that case, the AR device may generate audio descriptions and AR content for multiple identified objects. For example, the audio description may indicate the audio controller is unsure which object is the source. Using FIG. 1 as an example, assume there was a basketball court next to the soccer field where children are playing basketball. The audio controller may output an audio descriptions that says "the source of the sound may be a soccer player kicking a soccer ball or a basketball player shooting a basketball."

Figure 6:
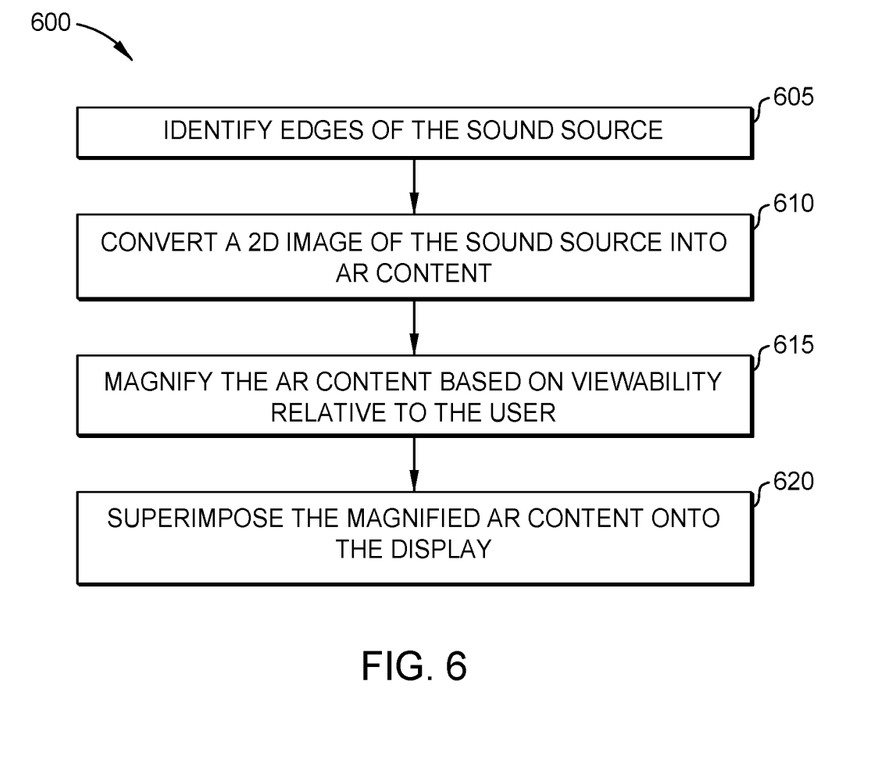
FIG. 6 is a flowchart for generating magnified AR content of a real-world event, according to one embodiment described herein.

FIG. 6 is a flowchart of a method 600 for generating magnified AR content of a real-world event, according to one embodiment described herein. In one embodiment, the method 600 begins after the method 400 is used to identify the source of the sound from among the objects identified in the captured images. That is, the method 600 assumes the object identifier was able to identify the source of the sound.

At block 605, the AR controller identifies edges of the sound source. For example, as shown in FIG. 5, the identified sound source (e.g., object 510) is within a bounding box that includes more than just the object generating the sound. Using edge detection, the AR controller can remove (or crop) the portions of the bounding box that do not include the object (e.g., the player and the ball). This focuses the AR content on a cropped version of the sound source rather than any additional portions of the image that may have been grouped with the sound source when performing the ML techniques described above.

At block 610, the AR controller converts a 2D image of the sound source into AR content. That is, the AR controller converts the cropped version of the sound source generated at block 605 into a data structure suitable to be displayed as AR content on a display. In one embodiment, the AR controller may convert the sound source into a 3D object which can be displayed as AR content.

At block 615, the magnifier magnifies the AR content based on viewability of the user. Stated differently, the magnification can correspond to the visual abilities of the user. Greater magnification may be used for a user who is more visual impaired than another user. In another example, the magnification is based on the original size of the sound source in the FOV. If the sound source was already close to the user (and thus, took up a large percentage of the captured image), the magnifier may decide to not magnify the object. Conversely, if the sound source is small, or is located further away from the user, the magnifier can magnify the AR content so that the sound source occupies a minimum percentage of the display screen when outputted. This minimum percentage may vary depending on the visual abilities of the user. For example, a person who is more visually impaired may want the AR content to be magnified to occupy at least 20% of the screen while someone who is less visually impaired may want the AR content magnified to occupy at least 15% of the screen. In this manner, the magnified can be configured to satisfy the preferences and abilities of the users.

At block 620, the AR controller superimposes the magnified AR content onto the display. As mentioned above, the AR content can be displayed at the same location of the sound source in the display so that the AR content occludes the sound source. However, in another embodiment, the AR content is displayed on a side of the display so as to not occlude other objects in the FOV that may be close to the sound source.

The AR content may be displayed in parallel with the audio description. Further, the AR content can be dynamic and change as the position of the sound source changes. That is, the camera can continue to capture images of the sound source that are processed using the ML techniques described above to identify the source and generate the magnified AR content. In this manner, the AR device can provide AR content that changes along with the sound source in the environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the distance calculator, object identifier, speech generator, or magnifier) or related data available in the cloud. For example, these applications could execute on a computing system in the cloud to identify the sound source and generate the audio description and AR content. In such a case, the applications could generate the audio descriptions and AR content and store this information at a storage location in the cloud for retrieval by the AR device. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
identifying a sound of interest to a user;

capturing images in a direction of the sound relative to the user;
identifying a plurality of objects in the captured images, wherein the plurality of objects are potential candidates of a source of the sound;
identifying distances of the plurality of objects relative to the user;
comparing the distances of the plurality of objects to a distance of the source of the sound;
eliminating objects of the plurality of objects that do not have distances within a threshold value of the distance of the source of the sound from being the source of the sound;
identifying, based on the distance and a direction of the sound relative to the user, the source of the sound from the plurality of objects that were not eliminated;
generating text describing the source of the sound and an action being performed by the source of the sound using a machine learning (ML) technique;
generating, from the text, an audible signal that describes the source of the sound;
magnifying a portion of at least one of the captured images containing the source of the sound to generate augmented reality (AR) content; and
transmitting for output the audio description and the AR content, wherein the AR content is superimposed onto a display.

2. The method of claim 1 further comprising:
identifying directions of the plurality of objects relative to the user;
comparing the directions of the plurality of objects to the direction of the sound; and
eliminating objects of the plurality of objects from being the source of the sound that do not have directions within a threshold value of the direction of the sound.

3. The method of claim 2, further comprising:
characterizing a type of the sound and types of the plurality of objects; and
eliminating objects of the plurality of objects from being the source of the sound by inputting the types of the sound and the plurality of objects into a common sense knowledge base, wherein the common sense knowledge base indicates a feasibility that a particular type of object can generate a particular type of sound.

4. The method of claim 1, wherein identifying the plurality of objects in the captured images comprises using a ML technique to capture the plurality of objects in bounding boxes, wherein the method further comprises:
identifying edges of the source of the sound to crop the source of the sound from one of the bounding boxes.

5. The method of claim 1, wherein identifying a sound of interest to a user comprises:
identifying a change in a gaze of the user such that the user is gazing in a direction of the sound; and
automatically determining, based on the change in the gaze, the sound is of interest to the user.

6. A computer readable storage medium having computer-readable program code embodied therewith, the computer-readable program code executable by one or more computer processors to perform an operation, the operation comprising:
identifying a sound of interest to a user;
capturing images in a direction of the sound relative to the user;
identifying a plurality of objects in the captured images, wherein the plurality of objects are potential candidates of a source of the sound;
identifying distances of the plurality of objects relative to the user;
comparing the distances of the plurality of objects to a distance of the source of the sound;
eliminating objects of the plurality of objects that do not have distances within a threshold value of the distance of the source of the sound from being the source of the sound;
identifying, based on the distance and a direction of the sound relative to the user, the source of the sound from the plurality of objects that were not eliminated;
generating text describing the source of the sound and an action being performed by the source of the sound using a machine learning (ML) technique;
generating, from the text, an audible signal that describes the source of the sound;
magnifying a portion of at least one of the captured images containing the source of the sound to generate AR content; and
transmitting for output the audio description and the AR content, wherein the AR content is superimposed onto a display.

7. The computer readable storage medium of claim 6, wherein identifying a sound of interest to a user comprises:
identifying a change in a gaze of the user such that the user is gazing in a direction of the sound; and
automatically determining, based on the change in the gaze, the sound is of interest to the user.

8. The computer readable storage medium of claim 6, the operation further comprising:
identifying directions of the plurality of objects relative to the user;
comparing the directions of the plurality of objects to the direction of the sound; and
eliminating objects of the plurality of objects from being the source of the sound that do not have directions within a threshold value of the direction of the sound.

9. The computer readable storage medium of claim 8, the operation further comprising:
characterizing a type of the sound and types of the plurality of objects; and
eliminating objects of the plurality of objects from being the source of the sound by inputting the types of the sound and the plurality of objects into a common sense knowledge base, wherein the common sense knowledge base indicates a feasibility that a particular type of object can generate a particular type of sound.

10. The computer readable storage medium of claim 6, wherein identifying the plurality of objects in the captured images comprises using a ML technique to capture the plurality of objects in bounding boxes, wherein the method further comprises:
identifying edges of the source of the sound to crop the source of the sound from one of the bounding boxes.

11. An AR device, comprising:
a display;
a speaker;
a processor;
memory comprising a computer program, wherein, when executed by the processor, the computer program performs an operation, the operation comprising:
identifying a sound of interest to a user;
capturing images in a direction of the sound relative to the user;
identifying a plurality of objects in the captured images, wherein the plurality of objects are potential candidates of a source of the sound;

identifying distances of the plurality of objects relative to the user;

comparing the distances of the plurality of objects to a distance of the source of the sound;

eliminating objects of the plurality of objects that do not have distances within a threshold value of the distance of the source of the sound from being the source of the sound;

identifying, based on the distance and a direction of the sound relative to the user, the source of the sound from the plurality of objects that were not eliminated;

generating text describing the source of the sound and an action being performed by the source of the sound using a machine learning (ML) technique;

generating, from the text, an audible signal that describes the source of the sound;

magnifying a portion of at least one of the captured images containing the source of the sound to generate AR content; and outputting the audio description using the speaker and the AR content using the display.

12. The AR device of claim 11, the operation further comprising:

identifying directions of the plurality of objects relative to the user;

comparing the directions of the plurality of objects to the direction of the sound; and eliminating objects of the plurality of objects from being the source of the sound that do not have directions within a threshold value of the direction of the sound.

13. The AR device of claim 12, the operation further comprising:

characterizing a type of the sound and types of the plurality of objects; and eliminating objects of the plurality of objects from being the source of the sound by inputting the types of the sound and the plurality of objects into a common sense knowledge base, wherein the common sense knowledge base indicates a feasibility that a particular type of object can generate a particular type of sound.

14. The AR device of claim 11, wherein identifying the plurality of objects in the captured images comprises using a ML technique to capture the plurality of objects in bounding boxes, wherein the method further comprises:

identifying edges of the source of the sound to crop the source of the sound from one of the bounding boxes.

* * * * *